(12) United States Patent
Levi et al.

(10) Patent No.: US 8,874,736 B2
(45) Date of Patent: Oct. 28, 2014

(54) EVENT EXTRACTOR

(75) Inventors: Ithai Levi, Shoham (IL); Leonid Pekel, Yehud (IL); Peretz Regev, Yehud (IL); Yair Horovitz, Yehud (IL); Ofer Eliassaf, Yehud (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 114 days.

(21) Appl. No.: 13/453,034

(22) Filed: Apr. 23, 2012

(65) Prior Publication Data

US 2013/0282892 A1 Oct. 24, 2013

(51) Int. Cl.
*G06F 15/173* (2006.01)
*H04L 12/26* (2006.01)
*H04W 24/00* (2009.01)
*G06F 9/44* (2006.01)
*H04W 4/02* (2009.01)

(52) U.S. Cl.
CPC .............. *H04L 43/50* (2013.01); *H04W 4/02* (2013.01); *H04W 24/00* (2013.01); *G06F 8/34* (2013.01)
USPC .............. 709/224; 370/252; 707/608; 726/1; 703/13; 717/124

(58) Field of Classification Search
CPC ... H04L 47/10; H04L 29/08072; H04L 63/20; H04L 43/50; H04W 24/00; H04W 4/02; G06F 8/34; G06F 11/3636; G06F 11/3466; G06F 11/3688; G06Q 10/10
USPC .......... 370/252; 709/224; 715/771; 726/1, 4; 707/608, 104.1, 200; 703/13; 717/124; 235/492; 705/26; 725/32
See application file for complete search history.

(56) References Cited

U.S. PATENT DOCUMENTS

| | | | |
|---|---|---|---|
| 7,653,006 B1 * | 1/2010 | Marino et al. ................ 370/252 |
| 7,689,665 B2 | 3/2010 | Lipton et al. |
| 8,112,262 B1 * | 2/2012 | Michelsen ...................... 703/13 |
| 2004/0002996 A1 * | 1/2004 | Bischof et al. ............. 707/104.1 |
| 2004/0222305 A1 * | 11/2004 | Leaming ........................ 235/492 |
| 2005/0204343 A1 * | 9/2005 | Kisamore et al. ............. 717/124 |
| 2006/0039538 A1 | 2/2006 | Minnis et al. |
| 2006/0095476 A1 * | 5/2006 | Dauer et al. .................. 707/200 |
| 2008/0307486 A1 * | 12/2008 | Ellison et al. ..................... 726/1 |
| 2009/0138945 A1 * | 5/2009 | Savchuk ........................... 726/4 |
| 2009/0207745 A1 | 8/2009 | Huq et al. |
| 2009/0287791 A1 | 11/2009 | Mackey |
| 2009/0300532 A1 * | 12/2009 | Cowan .......................... 715/771 |
| 2010/0003923 A1 | 1/2010 | McKerlich et al. |
| 2010/0042511 A1 * | 2/2010 | Sundaresan et al. ............ 705/26 |
| 2010/0180023 A1 * | 7/2010 | Kraus et al. ................... 709/224 |
| 2012/0041922 A1 * | 2/2012 | Vainer et al. .................. 707/608 |
| 2013/0014156 A1 * | 1/2013 | Seo ................................. 725/32 |

OTHER PUBLICATIONS

Politecnico di Torino, The WinPcap manual and tutorial for WinPcap 4.1.2, Dec. 31, 2007, Version 4.1.2.*

* cited by examiner

*Primary Examiner* — Oleg Survillo
*Assistant Examiner* — Schquita Goodwin

(57) ABSTRACT

A system can comprise a memory to store machine readable instructions. The system can also comprise a processing unit to execute the machine readable instructions. The machine readable instructions can comprise an event extractor to parse a packet capture (pcap) file that includes a packet transmitted via a network between an application under test (AUT) executing on a mobile device and a server to determine a network event based on the packet. The event extractor can also generate an application programming interface (API) command file that includes an API command generated based on the network event.

13 Claims, 5 Drawing Sheets

| PACKET NO. | SOURCE IP | DESTINATION IP | SOURCE PORT | DESTINATION PORT | PROTOCOL | TIMESTAMP | SOURCE MAC | DESTINATION MAC | DATA |
|---|---|---|---|---|---|---|---|---|---|
| 1 | xxx.xxx.xxx.xxx | yyy.yyy.yyy.yyy | J | L | HTTP | DATE&TIME | 01:23:45:67:89:AB | 01:23:45:67:89:AC | SAMPLE |
| ... | | | | | | | | | |
| N | xxx.xxx.xxx.xxx | yyy.yyy.yyy.yyy | J | L | HTTP | DATE&TIME | 01:23:45:67:89:AB | 01:23:45:67:89:AC | SAMPLE |

| NETWORK EVENT NO. |
|---|
| NETWORK EVENT 1 |
| NETWORK EVENT 2 |
| ... |
| NETWORK EVENT M |

| API COMMAND NO. | COMMAND TYPE |
|---|---|
| 1 | HTML CALL |
| 2 | DATA REQUEST |
| ... | |
| K | DATA RESPONSE |

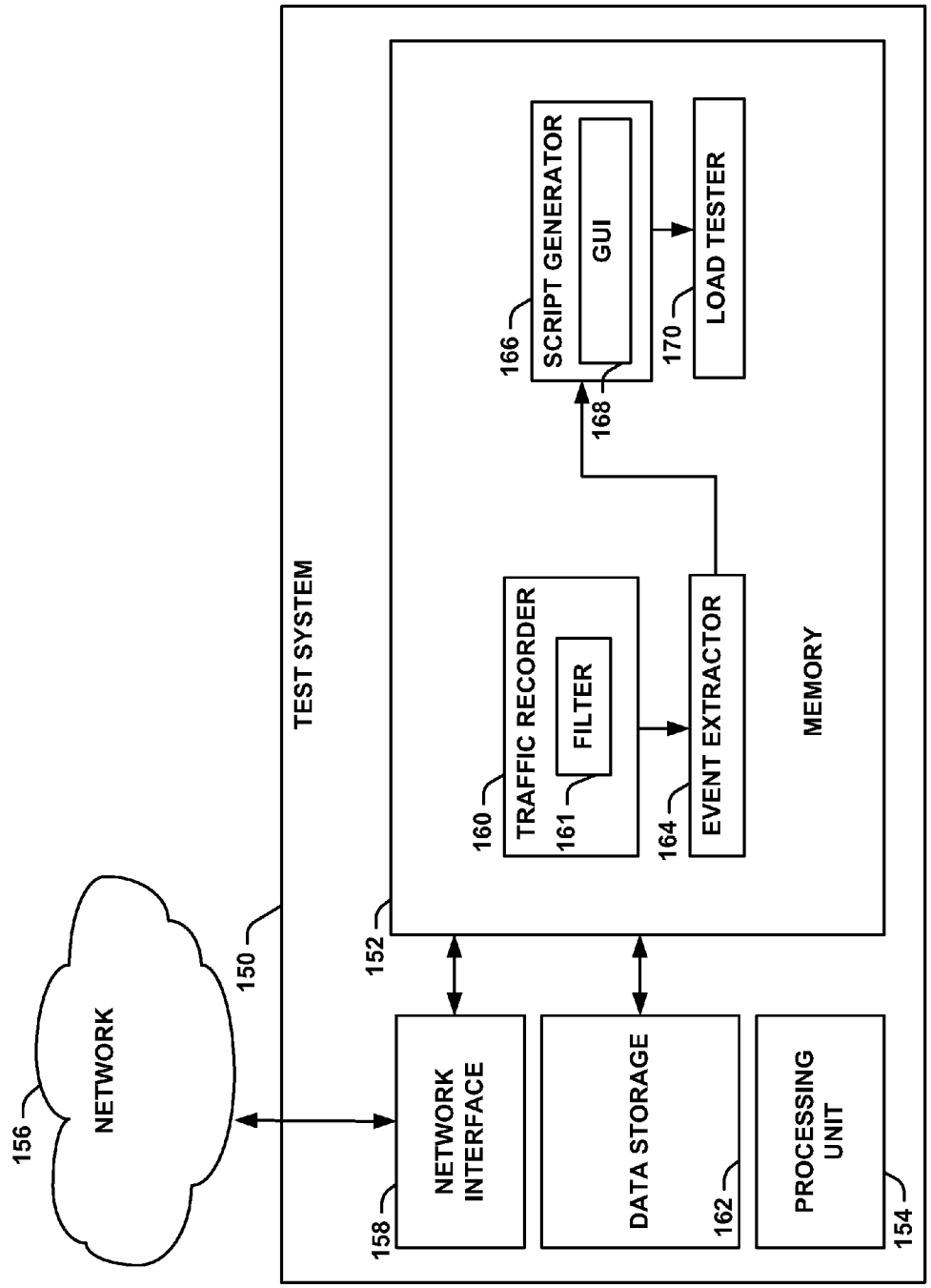

EVENT EXTRACTOR

BACKGROUND

A smartphone is a mobile phone built on a mobile computing platform, with more advanced computing ability and connectivity than a feature phone. In some examples, a smartphone can combine the functions of a personal digital assistant (PDA) and a mobile phone or camera phone. In other examples, a smartphone can also serve to combine the functions of portable media players, compact digital cameras, pocket video cameras, GPS navigation units and the like. Some smartphones can include a touch screen and/or a web browser that can access web pages.

Mobile applications, which can be referred to as mobile apps, are software applications, typically designed to run on smartphones and tablet computers. Mobile applications are available through application distribution platforms. In some examples, mobile applications can be downloaded from the distribution platform to a target device, such as a smartphone. In other examples, the mobile applications can be downloaded by laptop or desktop computers and transferred to the target device.

BRIEF DESCRIPTION OF THE DRAWINGS

FIG. 2 illustrates an example of a packet capture.

FIG. 3 illustrates an example of a network event list.

FIG. 4 illustrates an example of an application programming interface (API) command file.

FIG. 5 illustrates an example of a test system.

DETAILED DESCRIPTION

Figure 1:
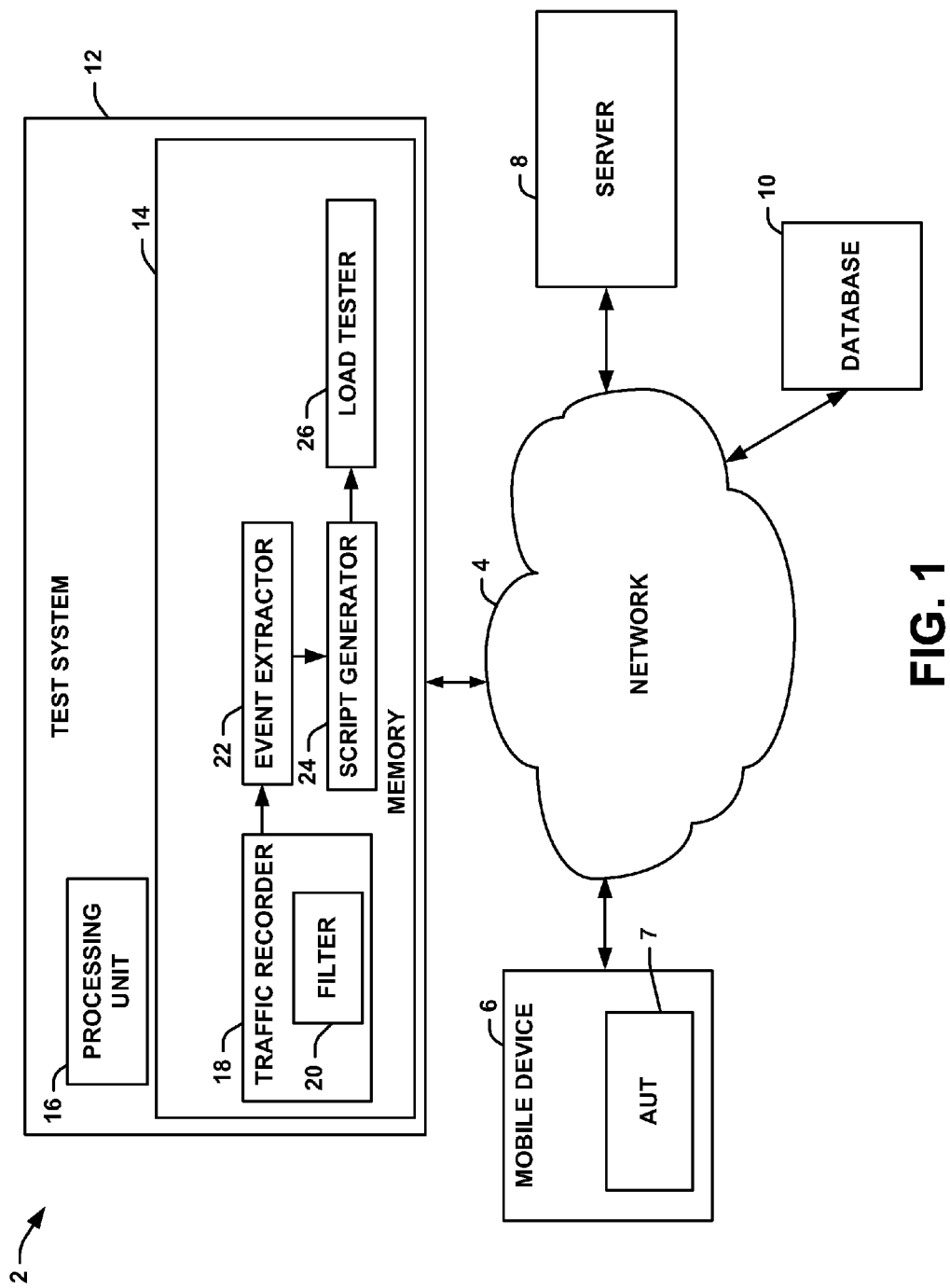
FIG. 1 illustrates an example of a system for generating a test script.

FIG. 1 illustrates an example of a system 2 for generating a test script for an application. The system 2 can include nodes that communicate on a network 4, such as the Internet, a private network or a combination thereof. The nodes on the network 4 can communicate via a communications protocol, such as Transmission Control Protocol/Internet Protocol (TCP/IP), Internet Protocol version 6 (IPv6) or the like.

For purposes of simplification of explanation, in the present example, different components of the system 2 are illustrated and described as performing different functions. However, in other examples, the functionality of several components can be combined and executed on a single component. The components can be implemented, for example, as software (e.g., machine executable instructions), hardware (e.g., an application specific integrated circuit), or as a combination of both (e.g., firmware). In other examples, the components could be distributed among remote devices across the network 4 (e.g., external web services).

In one example, a mobile device 6 can communicate with a server 8 via the network 4. The mobile device 6 could be implemented, for example, as a personal digital assistant (PDA), a smartphone, a tablet computer or the like. In some examples, the mobile device 6 can communicate with the network 4 wirelessly. In other examples, the mobile device 6 can be tethered to the network 4 through a wired connection. In some examples, the mobile device 6 can communicate with the server 8 via two networks. For instance, in some examples, the mobile device 6 can be connected to a cellular data network (e.g., a 3G or 4G telecommunications network) that is in turn coupled to a public network (e.g., the Internet). In such a situation, the network 4 can represent both the cellular data network and the public network. In other examples, the mobile device 6 can be coupled to the network 4 via a wireless fidelity (Wi-Fi) or a Worldwide Interoperability for Microwave Access (WiMax) connection.

The server 8 can be implemented as a computer that executes applications to service clients, such as the mobile device 6. In some examples, the server 8 could be implemented as a Web server and/or a resource server. In some examples, the server 8 can process and respond to requests from the mobile device 6. For instance, in one example, in response to a request, the server 8 can access a database 10 and retrieve a record. The record can be processed, which can include extrapolating and/or extracting data from the record and the server 8 can provide a response to the mobile device 6. To send the request to the server 8, the mobile device 6 can execute an application under test (AUT) 7 that can communicate with the server 8. In some examples, the AUT 7 can communicate with the server 8 via a specific port. The AUT 7 can be a mobile application (e.g., a mobile app) executing on the mobile device 6. For example, the AUT 7 can include executable instructions stored in memory of the mobile device 6 for testing a particular function or set of functions corresponding to operations of the mobile device that can involve communications via the network 4.

The mobile device 6 can be provided such that low level access to commands generated by the AUT 7 can be accessed without privileged access to the mobile device 6. Such privileged access can include root access or "superuser" access that has full file and administrative rights to the mobile device 6. In some examples, privileged access can require an expensive license agreement with a manufacturer of the mobile device 6. In other examples, privileged access can be acquired by "jailbreaking" (e.g., privilege escalation) which can violate user agreement terms and/or void a warranty of the mobile device 6.

A test system 12 can also be coupled to the network 4. The test system 12 can be logically stationed at a gateway of the network 4 to monitor incoming and outgoing traffic on the network 4. The test system 12 can include a memory 14 for storing machine readable instructions. The memory 14 could be implemented, for example, as volatile memory (e.g., random access memory), nonvolatile memory (e.g., flash memory, a hard drive or the like) or a combination thereof. The test system 12 can include a processing unit 16 for accessing the memory 14 and executing the machine readable instructions. The processing unit 16 could be implemented, for example, as a processor core. In the present examples, although the test system 12 can be logically stationed at the gateway between the AUT 7 and the server 8, in some examples, the test system 12 can be physically located (e.g., installed on) the server 8.

The memory 14 can include a traffic recorder 18 that can record network traffic between the AUT 7 of the mobile device 6 and the server 8. The traffic recorder 18 could be implemented, for example, as a sniffer (e.g., a packet sniffer). In some examples, the traffic recorder 18 can include a filter 20 to control the capture of packets communicated between the AUT 7 of the mobile device 6 and the server 8. For example, the filter 20 can limit which packets are captured from the network traffic to one or more of a specific IP address, a specific port, a specific resource locator (e.g., a uniform resource locator (URL)) request or the like. The traffic recorder 18 can store captured network traffic between the AUT 7 and the server 8 in memory as a packet capture file (e.g., a pcap file). In some examples, activation of the traffic recorder and/or modification of a parameter of the filter 20 can be set preemptively, such that the traffic recorder 18 is set to record and/or filter 20 the network traffic between the AUT 7 and the server 8 prior to initiation of traffic between the AUT 7 and the server 8. In other examples, activation of the traffic recorder 18 and/or modification of the parameter of the filter 20 can be implemented asynchronously during a time of network traffic flow between the AUT 7 on the server 8.

The traffic recorder 18 can provide the pcap file to an event extractor 22. The event extractor 22 can parse the pcap file to determine a network event. The network event could be, for example, a request for a connection, a response to the request, a closing of a connection or the like. Additionally, the event extractor 22 can generate an application programming interface (API) command (e.g., API call) based on the network event. The API command can be configured such that upon execution, the API command can simulate the network event on which the API command is based. To generate the API command, the event extractor 22 can employ network logic routines that analyze each network event to identify a corresponding API command. In some examples, the API command can be derived from multiple network events. The API command can be stored in an API command file.

The API command file can be provided to a script generator 24. The script generator 24 can be employed to generate a test script based on the API command file. The test script can be employed to simulate an instantiation and/or network activity of the AUT 7 at a mobile device 6 (e.g., a virtual mobile device). In some examples, the test script can be modified by the script generator 24 in response to user input. For instance, in response to the user input, the test script can be modified to add and/or change a script parameter, such as unique data (e.g., a username), data dependency (e.g., a password), data cache, a date constraint or the like.

The test script can be provided to a load tester 26 (or other tester) that can employ the script in a load test. In some examples, the load tester 26 can employ a virtual user generator (VuGen) to simulate actions of human users. Employment of the script in the load test can simulate an instantiation and/or network activity of the AUT 7 at a mobile device 6. In this manner, the load tester 26 can communicate with the server 8. Additionally, the load tester 26 can be configured to employ the script to simulate multiple instances and/or network activity of the AUT 7 at multiple respective mobile devices. In some examples, the load tester 26 can monitor network traffic provided from the server 8 to determine a maximum number of instances of the AUT 7 that can be serviced by the server 8 concurrently. In other examples, the load tester 26 can be integrated with the server 8, such that the load tester 26 can directly measure the health of the server 8.

By employment of the system 2, root access to the mobile device 6 is not needed since the test system 12 can be a separate device from the mobile device 6. Thus, in examples where the mobile device 6 is implemented as a smartphone, PDA or tablet computer, a load test for the AUT 7 can be generated without the need to "jailbreak" the mobile device 6. Additionally, since the script generated by the script generator 24 is based on actual network traffic between the AUT 7 and the server 8, the script, when executed, can more accurately reflect real world network traffic that can occur between the AUT 7 and the server 8 in comparison to an application simulator.

FIG. 2 illustrates an example of a pcap file 50 that could be generated, for example by the traffic recorder 18 illustrated in FIG. 1. The pcap file 50 can include N number of captured packets, where N is an integer greater than or equal to one. Each captured packet can include a packet number (labeled in FIG. 2 as "PACKET NO.") that indicates an order in which the packet was captured. Each captured packet can also include a source IP (labeled in FIG. 2 as "SOURCE IP") address that identifies a source of a given packet and a destination IP address (labeled in FIG. 2 as "DESTINATION IP") that identifies a destination IP addresses for the given packet. Each captured packet can also include a source port (labeled in FIG. 2 as "SOURCE PORT") and a destination port (labeled in FIG. 2 as "DESTINATION PORT") that respectively identify an IP port from which the given packet originated and an IP port for which be given packet is destined. Each captured packet can further include a protocol identifier (labeled in FIG. 2 as "PROTOCOL") that identifies the protocol for the given packet. Further, each captured packet can include a timestamp (labeled in FIG. 2 as "TIMESTAMP") that identifies a date and time that the given packet was provided from a source to a destination. Still further, each captured packet can include a source Media Access Control (MAC) address (labeled in FIG. 2 as "SOURCE MAC") and a destination MAC address (labeled in FIG. 2 as "DESTINATION MAC") that respectively identify a MAC address of the sender of the given packet and a MAC address of the destination of the given packet. Moreover, each given packet can include data (labeled in FIG. 2 as "DATA") that includes a payload of the given packet.

FIG. 3 illustrates an example of a network event list 100 that includes M number of network events that could be extracted by the event extractor 22 illustrated in FIG. 1, where M is an integer greater than or equal to one. Each network event can include a captured packet extracted from the pcap file 50 illustrated in FIG. 2. Each network event can include packets related to a given network event, such as a connection, a disconnection, a request, a response or the like.

FIG. 4 illustrates an example of an API command file 120 that could be generated by the event extractor 22 illustrated in FIG. 1. The API command file 120 can include K number of API commands that each correspond to a network event, where K is an integer greater than or equal to one. In the present example, the API command file can include an API command number (labeled in FIG. 4 as "API COMMAND NO." and a command type (labeled in FIG. 4 as "COMMAND TYPE"). The API command number can identify a sequence number for a given API command. The API command type can identify the type of API command. In some examples, the API command types include an HTML call, a data request and a data response. In other examples, other API commands could be employed.

FIG. 5 illustrates an example of a test system 150 that can be utilized to implement the test system 12 illustrated in FIG. 1. The test system 150 can include a memory 152 for storing machine executable instructions. The memory 152 could be implemented, for example, as random access memory, flash memory, a hard disk, a combination thereof, etc. The test system 150 can also include a processing unit 154 that can access the memory 152 and executes machine executable instructions. The processing unit 154 can be implemented, for example, as a processor core. The test system 150 can be coupled to a network 156 via a network interface 158, which could be implemented as a network interface card. The network 156 could be implemented, for example, as a cellular data network (e.g., 3G or 4G network), a public network (e.g., the Internet) or a combination thereof.

The memory 152 can include a traffic recorder 160 for recording network traffic between an AUT executing on a mobile device and a server. The mobile device could be implemented, for example, as a PDA, a smartphone, a tablet computer or the like. The server could be implemented, for example, as a computer that services the AUT. The test system 150 and the mobile device can be separate entities, such that the test system 150 does not require privileged access (e.g., root access) to the mobile device.

The network traffic recorded by the traffic recorder 160 can include a packet transmitted between the server and the AUT. The traffic recorder 160 can include a filter 161 for limiting the scope of the traffic recorded. The network traffic can be stored in a pcap file. In some examples, the pcap file can be implemented in a manner similar to the pcap file 50 illustrated on FIG. 2. The traffic recorder 160 can store the pcap file in data storage 162, which data storage 162 can be implemented as volatile or non-volatile memory.

The memory 152 can also include an event extractor 164 that can parse the pcap file to determine a network event related to functionality of the AUT. For instance, the network event could be implemented as an open connection, a close connection, a request, a response or the like. The event extractor 164 can generate a network event list that includes data representing captured packets consistent with a network event of interest (e.g., according to a filter parameter). In some examples, the network event list could be implemented in a manner similar to the network event list 100 illustrated in FIG. 3. The event extractor 164 can include network logic that can parse the network event list and determine an API command corresponding to the network event stored in the network event list. For example, the event extractor 164 can store the API command in an API command file. The event extractor 164 can store the API command file in the data storage 162. Additionally, the API command file can be provided to a script generator 166.

The script generator 166 can generate a test script based on the API command file to simulate an instance of the AUT executing on the mobile device. The script generator 166 can also include a graphical user interface (GUI) 168 that can receive user input to modify the test script. By employing the GUI 168, parameters for the test script can be added and/or modified. The script generator 166 can store the test script in the data storage 162. The test script can be provided to a load tester 170. The load tester 170 can employ the test script in a load test to simulate an instantiation of the AUT. Additionally, the load tester 170 can simulate a plurality of instances and/or network activity of the AUT at a plurality of respective mobile devices to determine operating parameters for the server resulting from such instances of the AUT. In some examples, the load tester 170 can simulate the plurality of instances to stress test the server to determine a maximum number of instances of the AUT that are serviceable by the server.

Figure 6:
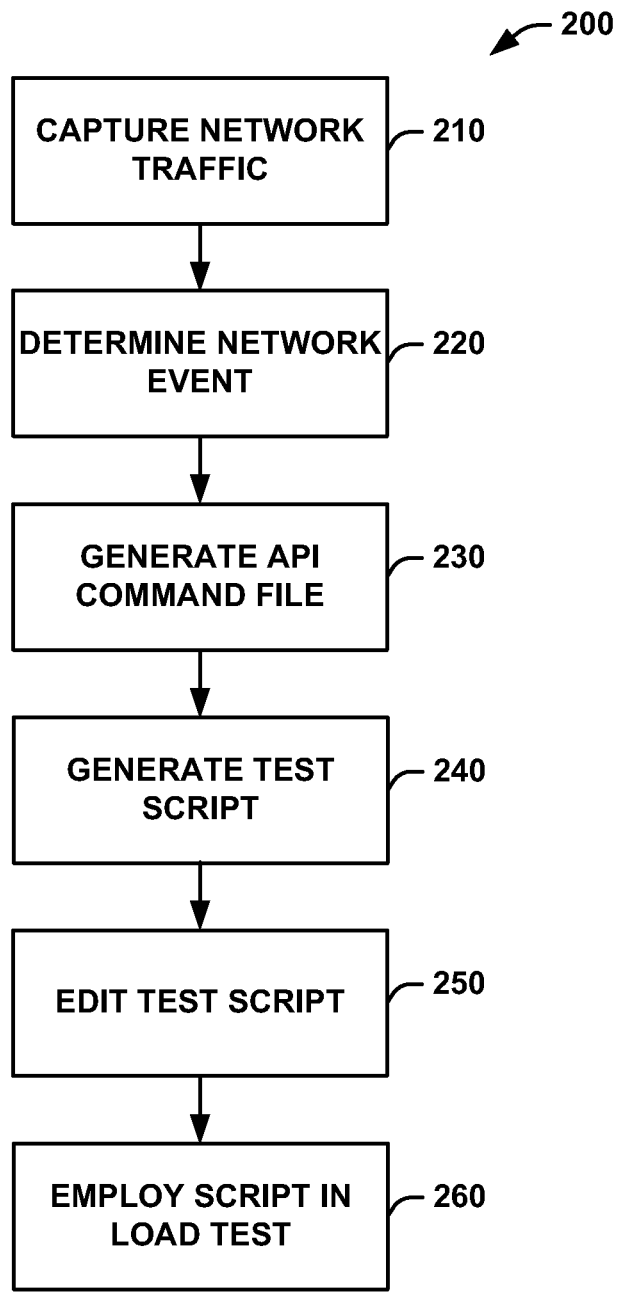
FIG. 6 illustrates an example flowchart of an example method for generating and executing a test script.
Figure 7:
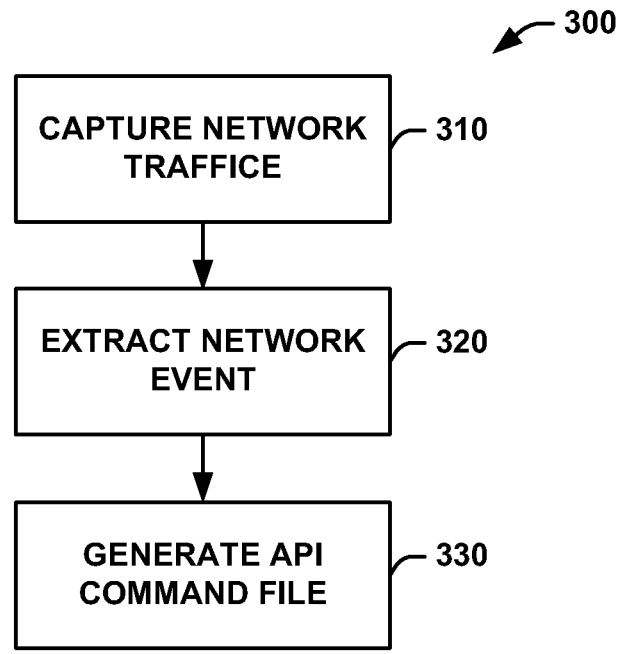
FIG. 7 illustrates an example flowchart of an example method for generating an API command file.
Figure 8:
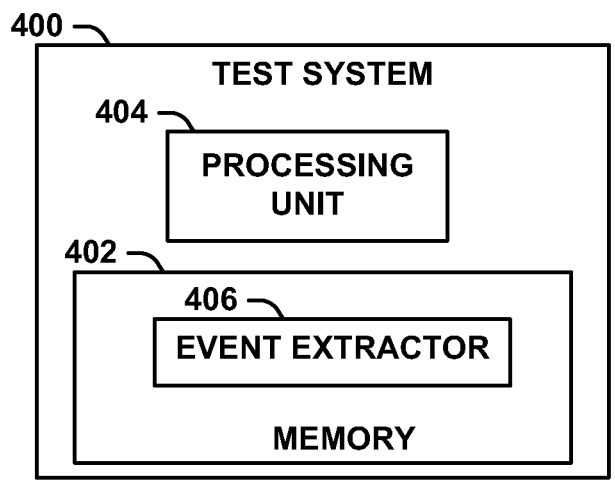
FIG. 8 illustrates another example of a test system.

In view of the foregoing structural and functional features described above, example methods will be better appreciated with reference to FIGS. 6-7. While, for purposes of simplicity of explanation, the example methods of FIGS. 6-7 are shown and described as executing serially, the present examples are not limited by the illustrated order, as some actions could in other examples occur in different orders and/or concurrently from that shown and described herein. Moreover, it is not necessary that all described actions be performed to implement a method.

FIG. 6 illustrates a flow chart of an example method 200 for generating and employing a test script. The method 200 could be executed, for example, by a test system (e.g., the test system 12 illustrated in FIG. 1 and/or the test system 150 illustrated in FIG. 5). At 210, network traffic between and an AUT (e.g., the AUT 7 illustrated in FIG. 1) executing on a mobile device (e.g., the mobile device 6 illustrated in FIG. 1) and a server (e.g., the server 8 illustrated on FIG. 1) can be captured by a traffic recorder of the test system. The traffic recorder could be implemented, for example, as a packet sniffer. In some examples, the traffic recorder could be implemented in a manner similar to the traffic recorder 18 illustrated in FIG. 1. The traffic recorder can store a captured packet in a pcap file (e.g., the pcap file 50 illustrated in FIG. 2). At 220, an event extractor (e.g., the event extractor 22 illustrated in FIG. 1) can parse the pcap file to determine a network event corresponding to the captured packet. At 230, the event extractor can generate an API command file (e.g., the API command file 120 illustrated in FIG. 4) that can include an API command that can be determined for the network event. To generate the API command file, the event extractor can employ network logic.

At 240, a script generator (e.g., the script generator 24 illustrated in FIG. 1) can generate a test script based on the API command file. At 250, the test script can be edited, for example in response to user input. Editing of the test script can add, remove and/or modify a parameter of the test script. At 260, a tester (e.g., the load tester 26 illustrated in FIG. 1) can employ the test script to simulate instantiation and/or network activity of the AUT at a mobile device, and determine, for instance, a maximum number of instances of the AUT executing on mobile devices that can be serviced concurrently.

By utilization of the method 200, a test script that accurately simulates human use of the AUT can be generated. Moreover, in the method 200, there is no need for the traffic recorder to execute at the mobile device, thereby obviating the need for privileged access (e.g., root access) to the mobile device.

FIG. 6 illustrates a flowchart of an example method 300 for generating an API command file. At 310, network traffic between an AUT (e.g., the AUT 7 illustrated in FIG. 1) executing on a mobile device (e.g., the mobile device 6 illustrated on FIG. 1) and a server (e.g., the server 8 illustrated on FIG. 1) can be captured. The network traffic can be stored in a pcap file (e.g., the pcap file 50 illustrated in FIG. 2). At 320, a network event can be extracted from the pcap file. At 330, the API command file (e.g., the API command file 120 illustrated in FIG. 4) can be generated based on the network event.

FIG. 7 illustrates an example of a test system 400. The system 400 can comprise a memory 402 to store machine readable instructions. The system 400 can also comprise a processing unit 404 to access the memory and execute the machine readable instructions. The machine readable instructions can comprise an event extractor 406 to parse a pcap file that includes a packet transmitted via a network between an AUT executing on a mobile device and a server to determine a network event based on the packet. The event extractor 406 can also generate an API command file that includes an API command generated based on the network event.

Where the disclosure or claims recite "a," "an," "a first," or "another" element, or the equivalent thereof, it should be interpreted to include one or more than one such element, neither requiring nor excluding two or more such elements. Furthermore, what have been described above are examples. It is, of course, not possible to describe every conceivable combination of components or methods, but one of ordinary skill in the art will recognize that many further combinations and permutations are possible. Accordingly, the invention is intended to embrace all such alterations, modifications, and variations that fall within the scope of this application, including the appended claims.

What is claimed is:

1. A method comprising:
capturing, in the absence of root access to a mobile device, network traffic between an application under test (AUT) executing on the mobile device and a server, the network traffic being stored in memory as a packet capture (pcap) file wherein the packet is generated by the AUT in the absence of root access to the mobile device;
extracting a network event from the pcap file;
analyzing the network event to identify a corresponding application programming interface (API) command; and
generating an API command file based on the network event.

2. The method of claim 1, further comprising generating a test script based on the API command file.

3. The method of claim 2, further comprising editing the test script to add, modify and/or remove a parameter of the test script in response to a user input.

4. The method of claim 3, further comprising executing the test script to simulate a plurality of instances and/or network activity of the AUT executing at a plurality of mobile devices.

5. A system comprising:
a memory storing machine readable instructions; and
a processing unit comprising a processing core configured to access the memory and execute the machine readable instructions, the machine readable instructions comprising:
an event extractor configured to:
parse a packet capture (pcap) file that includes a packet transmitted via a network between an application under test (AUT) executing on a mobile device configured to communicate wirelessly on the network and a server to determine a network event based on the packet, wherein the packet is generated by the AUT in the absence of root access to the mobile device;
analyze the network event to identify a corresponding application programming interface (API) command; and
generate an API command file that includes:
the corresponding API command generated based on the network event; and
a traffic recorder configured to:
capture the packet and generate the pcap file; and
execute in the absence of root access to the mobile device.

6. The system of claim 5, wherein the mobile device comprises a smartphone or tablet computer.

7. The system of claim 6, wherein the machine readable instructions further comprise a script generator configured to generate a test script for the AUT based on the API command file.

8. The system of claim 7, wherein the machine readable instructions further comprise a tester configured to employ the script file to simulate a plurality of instances and/or network activity of the AUT.

9. The system of claim 7, wherein the script generator is further configured to edit the test script in response to user input.

10. The system of claim 5, wherein the traffic recorder is logically stationed on the network between the mobile device and the server.

11. The system of claim 5, wherein the API command comprises a uniform resource locator (URL) call.

12. A memory configured to store machine readable instructions, the machine readable instructions comprising:
a traffic recorder configured to operate in the absence of root access to the mobile device, the traffic recorder comprising:
a packet sniffer configured to:
capture a packet transferred over a network between an application under test (AUT) executing on a mobile device configured to communicate wirelessly on the network and a server, the packet sniffer configured to selectively capture the packet based on a parameter of a filter set for the traffic recorder, wherein the packet is generated by the AUT in the absence of root access to the mobile device; and
store the captured packet in a packet capture (pcap) file; and
an event extractor configured to:
parse the pcap file based on the filter to determine a network event based on the packet in the pcap file;
analyze the network event to identify a corresponding application programming interface (API) command; and
generate an API command file comprising the corresponding API command, the corresponding API command comprising a resource locator call, the corresponding API command being based on the network event;
a script generator configured to:
generate a test script for the AUT based on the corresponding API command; and
edit the test script to add a parameter to the test script in response to a user input; and
a tester configured to execute the test script to simulate a plurality of instances and/or network activity of the AUT executing on a plurality of mobile devices.

13. The memory of claim 12, wherein the traffic recorder is logically stationed on the network between the mobile device and the server.

* * * * *